(12) United States Patent
Josse et al.

(10) Patent No.: US 10,003,276 B2
(45) Date of Patent: Jun. 19, 2018

(54) POWER CONVERTER COMPRISING AN ARCHITECTURE HAVING NONALIGNED ARMS

(71) Applicant: Alstom Technology Ltd, Baden (CH)

(72) Inventors: Philippe Josse, Paris (FR); Joël Devautour, Le Pacq (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 72 days.

(21) Appl. No.: 14/770,947

(22) PCT Filed: Feb. 27, 2014

(86) PCT No.: PCT/EP2014/053794
§ 371 (c)(1),
(2) Date: Aug. 27, 2015

(87) PCT Pub. No.: WO2014/131817
PCT Pub. Date: Sep. 4, 2014

(65) Prior Publication Data
US 2016/0013729 A1    Jan. 14, 2016

(30) Foreign Application Priority Data

Feb. 28, 2013  (FR) ...................................... 13 51819

(51) Int. Cl.
*H02M 7/06* (2006.01)
*H02M 7/00* (2006.01)
*H02M 7/08* (2006.01)

(52) U.S. Cl.
CPC ............. *H02M 7/06* (2013.01); *H02M 7/003* (2013.01); *H02M 7/08* (2013.01)

(58) Field of Classification Search
CPC .......... H02M 7/003; H02M 7/06; H02M 7/08; H02M 3/10; H02M 3/155; H02M 3/158;
(Continued)

(56) References Cited

U.S. PATENT DOCUMENTS 5,089,835 A * 2/1992 Kitagishi ............... G03B 13/24
359/569
8,488,354 B2 * 7/2013 Swamy .................. H02M 7/08
363/126
(Continued)

FOREIGN PATENT DOCUMENTS

FR       2 967 317 A1     11/2010
WO    2012089751 A1      7/2012

OTHER PUBLICATIONS

Jean-Luc Schanen, Jean-Michel Guichon, James Roudet, Cyril Domenech, Luc Meysenc. "Impact of the Physical Layout of High-Current Rectifiers on Current Division and Magnetic Field Using PEEC Method". IEEE Transactions on Industry Applications, Institute of Electrical and Electronics Engineers, Mar./Apr. 2010, 46 (2), pp. 892-900.*

(Continued)

*Primary Examiner* — Fred E Finch, III
*Assistant Examiner* — Demetries A Gibson
(74) *Attorney, Agent, or Firm* — GE Global Patent Operation; Scott R. Stanley

(57) ABSTRACT

The invention mainly provides a power converter (3) including a positive converter bridge (P+) and a negative converter bridge (P−), the converter bridges being of the diode bridge type and being connected in parallel, each converter bridge including a first series of arms of components connected to the phases of the first secondary of the transformer (2) and a second series of arms of components connected to the phases of the second secondary of the transformer (2), said power converter being characterized in that at least one series of arms of components includes arms (B1, B2, B3) disposed relative to one another in such a manner as not to be aligned in the same plane.

9 Claims, 3 Drawing Sheets

(58) Field of Classification Search
CPC .............. H02M 3/1582; H02M 3/285; H02M 3/33523; H02M 3/33569; H02M 3/33592; H02M 3/337; H02M 5/10; H02M 5/271; H02M 5/4505
See application file for complete search history.

(56) References Cited

U.S. PATENT DOCUMENTS

| | | | | |
|---|---|---|---|---|
| 8,885,372 B1* | 11/2014 | Nanut | ..................... | H02M 1/12 307/11 |
| 2005/0013147 A1* | 1/2005 | Villablanca | ............. | H02M 1/15 363/44 |
| 2009/0027934 A1* | 1/2009 | Robledo Bustos | . | H02M 7/2173 363/126 |
| 2012/0007530 A1* | 1/2012 | Imai | ..................... | H02M 7/003 318/400.25 |
| 2013/0016548 A1* | 1/2013 | Seki | ........................ | H01L 24/32 363/131 |
| 2013/0119525 A1* | 5/2013 | Tsuyuno | ................. | B60L 1/003 257/675 |
| 2013/0301320 A1* | 11/2013 | Mariadassou | ........... | H02M 7/08 363/70 |
| 2014/0015629 A1* | 1/2014 | Zeng | ..................... | H02P 13/06 336/5 |

OTHER PUBLICATIONS

Mariadassou; Prithu., Compact Diode/Thyristor Rectifier Architure Allowing High Power, May 2012, WO-2012/062707.*
Syed M. Peeran et al., "Current Balance in Parallel Power Diodes in Three-Phase Rectifiers" IEEE Transactions on Industry Applications, vol. 43, No. 3, May/Jun. 1987.
Jean-Luc Schanen et al., "Impact of the Physical Layout of High-Current Rectifiers on Current Division and Magnetic Field Using PEEC Method" IEEE Transactions on Industry Application, vol. 46, No. 2, Mar./Apr. 2010.
Search Report issued in French Patent Application No. FR 13 51819 dated Dec. 17, 2013.
International Search Report issued in Application No. PCT/EP2014/053794 dated May 14, 2015.
Written Opinion issued in Application No. PCT/EP2014/053794 dated May 14, 2015.
U.S. Appl. No. 14/770,643, "Connection Bar Architecture for High-Power Converter" filed Aug. 26, 2015.

* cited by examiner

POWER CONVERTER COMPRISING AN ARCHITECTURE HAVING NONALIGNED ARMS

BACKGROUND OF THE INVENTION

Technical Field

The present invention relates to the field of high-power converters, and in particular to the architecture of high-power rectifiers in electrolysis, in particular for electrolysis of aluminum.

The invention relates more particularly to a power converter including non-aligned arms and a high-power converter circuit including such a power converter.

State of the Prior Art

In the field of power electronics, high-power converters for electrolysis are typically rectifiers that directly convert an alternating current (AC) source into a direct current (DC) source.

Such rectifiers can have a high power of about one hundred mega volt amps (MVA) and deliver electrical currents as high, for example, as 110 kilo amps (kA). Such rectifiers can be rectifiers using diode technology, also referred to as "non-controlled rectifiers", or else they can be rectifiers using thyristor technology, also referred to as "controlled rectifiers".

These rectifiers can, in particular, serve to produce aluminum by an electrolytic reduction process, or indeed to produce non-ferrous metals, such as zinc, copper, or chlorine. Such rectifiers can also be used to power something other than electrolysis pots, in particular for electro-intensive methods requiring high-power DC power supplies, e.g. electric arc furnaces or plasma generators.

DESCRIPTION OF RELATED ART

FIG. 1 shows a simplified electric diagram of a converter circuit 10 that can be found conventionally in an installation of an electrolysis plant for the purpose of powering electrolysis pots. The DC power supply is constituted by a putting in parallel a plurality of power supplies as described below, that can be referred to commonly as "groups".

The rectifier circuit 10 receives AC from the three-phase high-voltage AC electricity grid R. Starting from the three-phase AC grid R, the rectifier circuit 10 includes a first group including a three-phase adjustment transformer (known as an "OLTC" for "On-Line Tap Changer") making it possible to adjust the voltage of the grid to an intermediate voltage, a second group 2 including a three-phase rectifier transformer making it possible to adjust the intermediate voltage to the appropriate off-load voltage that depends on the value of the voltage of the load, and to deliver the high currents necessary for the electrolysis process, a third group 3 including a diode rectifier or a thyristor rectifier making it possible to deliver the electric current and the rectified voltage to the load, and a fourth group 4 including a set of power busbars making it possible to connect the various groups together in parallel, and to feed DC power to an electrolysis installation or an electrolysis series or line, or any other suitable apparatus.

FIG. 2 shows a simplified electric circuit diagram of the diode bridge circuit or "Graetz circuit" type that gives in detail the arrangement of a twelve-phase rectifier of the third group 3 to which a rectifier transformer of the second group 2 is connected. As can be seen in FIG. 2, the three phases $U_A$, $V_A$, $W_A$ of a first secondary power a rectifier bridge of positive polarity P+ having six groups (or arms) equipped with fuses and semiconductors and three phases $U_Y$, $V_Y$, $W_Y$ of a second secondary of the rectifier transformer powering a rectifier bridge of negative polarity P− having six groups (or arms) equipped with fuses and semiconductors of the rectifier, the two rectifier bridges P+ and P− being connected in parallel. Each rectifier bridge is of the diode bridge type. In addition, each of the six arms $U_A^+$, $V_A^+$, $W_A^+$, $U_Y^+$, $V_Y^+$, $W_Y^+$ of the rectifier bridge of positive polarity P+ and each of the six arms $U_A^-$, $V_A^-$, $W_A^-$, $U_Y^-$, $V_Y^-$, $W_Y^-$ of the rectifier bridge of negative polarity P− is constituted by connecting in parallel n diodes or thyristors making it possible to reach a current rating that is desired for the rectifier (zone A of FIG. 2). As can be seen in said zone A, each diode 5 (or thyristor) of the n diodes (or thyristors) is connected in series with a fuse 6 making it possible to remove any fault and making continued operation possible in the event of failure of a diode or thyristor.

High power operation of the rectifier results in major constraints in terms of balancing the current of the arms of the rectifier bridges. In order to accommodate an increase in the value of the rectified voltage that typically reaches values of about 2200 V DC, it is necessary to increase the number n of components (diodes or thyristors and fuses) connected together in parallel. For example, for a rectifier of the 2200 V DC/100 kA type, it is necessary to provide in the range 18 to 20 components in parallel per arm, this number being a function of the type of component and of the severity of the operating conditions. Connecting in parallel an increasing number of components leads to problems of balance in current between the components of an arm. Since the dimensioning, and thus, in particular, the number and the overall size occupied by all of the components of the rectifier, are determined relative to the most current-unbalanced component in the arm, it is necessary to be able to minimize the imbalance in current thereof.

SUMMARY OF THE INVENTION

An object of the invention is to remedy at least in part the above-mentioned needs and drawbacks.

A particular object of the invention is to prevent, or at least to minimize, the imbalance in current between the components of a high-power converter by means of an architecture in which the arms are not aligned in the same plane.

In one of its aspects, the invention thus provides a power converter, in particular a rectifier, including:

a positive converter bridge designed to be connected to the phases of a first secondary and to the phases of a second secondary of a transformer;

a negative converter bridge designed to be connected to the phases of the first secondary and to the phases of the second secondary of a transformer;

the positive converter bridge and the negative converter bridge being of the diode bridge type and being connected in parallel;

each converter bridge including a first series of arms of components connected to the phases of the first secondary of the transformer and a second series of arms of components connected to the phases of the second secondary of the transformer;

said power converter being characterized in that at least one series of arms of components includes arms disposed relative to one another in such a manner as not to be aligned in the same plane.

By means of the invention, it is possible to reduce the imbalance in current between components in the same arm of a power converter. Since the dimensioning is performed in part relative to the component that is the most imbalanced in current in an arm, the invention can thus make it possible to improve significantly the dimensioning of power converters, and in particular of high-power rectifiers. In addition, the fact that the arms of at least one series of arms of components have a non-aligned architecture can make it possible to reduce the center-to-center distance between the arms and to have a more compact architecture. In this way, the invention can make it possible to improve compactness and thus to save space, including for transport purposes.

The power converter of the invention may also have one or more of the following characteristics taken in isolation or in any technically feasible combination.

The power converter may be a high-power rectifier for electrolysis, in particular for electrolysis of aluminum.

The converter may be a twelve-phase converter. Each converter bridge may include six arms of semiconductor components and fuses. In particular, each converter bridge may thus include a first series of three arms connected to the phases of the first secondary of the transformer and a second series of three arms connected to the phases of the second secondary of the transformer.

When observed in cross-section, the arms of said at least one series of arms of components define the vertices of a polygon. For example, when said at least one series of arms of components comprises three arms, the three arms may define the three vertices of a triangle.

At least a first subset of the arms of said at least one series of arms of components includes arms aligned in a first plane, and at least a second subset of the arms of said at least one series of arms of components may include arms aligned in a second plane, and the first plane and the second plane are intersecting.

The maximum value for the imbalance in current in any given arm of the positive converter bridge and/or of the negative converter bridge is less than or equal to 15%, and more preferably less than or equal to 11%, or, at least, 5% less than prior art solutions, this maximum value ($dI_{max}$) being determined by the following formula:

$$dI\max = 100 \times \frac{I\max \text{ of a component in the arm} - I\text{mean of all of the components in the arm}}{I\text{mean of all of the components in the arm}}$$

Each arm of the positive converter bridge and/or of the negative converter bridge is constituted by connecting in parallel a plurality of diodes and/or thyristors. Each diode or thyristor may be connected in series with a fuse. Thus, each arm of the positive converter bridge and/or of the negative converter bridge may include n fuses associated with n diodes or thyristors connected in parallel.

The distance between two consecutive arms of said at least one series of arms of components can be greater than the distance that would exist between said two consecutive arms in any configuration in which the arms of said at least one series of arms of components are disposed relative to one another in such a manner as to be aligned in the same plane.

The distance between a first arm and a third arm of said at least one series of arms of components, where the first arm and the third arm are situated on either side of a second arm of said at least one series and the first and second arms are, in particular, adjacent, as are the second and third arms, can be less than the distance that would exist between said first arm and said third arm in any configuration in which the first, second, and third arms of said at least one series of arms of components are disposed relative to one another in such a manner as to be aligned in the same plane.

In another of its aspects, the invention provides a high-power converter circuit, in particular for an installation of an electrolysis plant, said circuit being characterized in that it includes:
  a transformer including a first secondary and a second secondary; and
  a power converter as defined above.

The transformer may be a rectifier transformer and the power converter may be a high-power rectifier, in particular for electrolysis.

The converter circuit of the invention may have any of the above-listed characteristics taken in isolation or in any technically feasible combination with other characteristics.

BRIEF DESCRIPTION OF THE DRAWINGS

The invention can be better understood on reading the following detailed description of a non-limiting embodiment of the invention, and on examining the diagrammatic and fragmentary figures of the accompanying drawings, in which.

In all of these figures, identical references may designate elements that are identical or elements that are analogous.

DETAILED DESCRIPTION OF A PARTICULAR EMBODIMENT

In the following description of the figures, the power converter 3 is a high-power rectifier for electrolysis of aluminum. The rectifier 3 may be similar to the rectifier shown in the above-described electric circuit diagram of FIG. 2.

In particular, the rectifier 3 is a twelve-phase rectifier and it includes a rectifier bridge of positive polarity P+ and a rectifier bridge of negative polarity P−, each of which includes six arms of semiconductor components.

The positive converter bridge P+ and the negative converter bridge P− can be thought of as a common converter bridge designed to be connected to the phases of a first secondary ($U_A$, $V_A$, $W_A$), this converter bridge including three arms connected to the positive polarity ($U_A^+$, $V_A^+$, $W_A^+$) and three other arms connected to the negative polarity ($U_A^-$, $V_A^-$, $W_A^-$).

Figure 1:
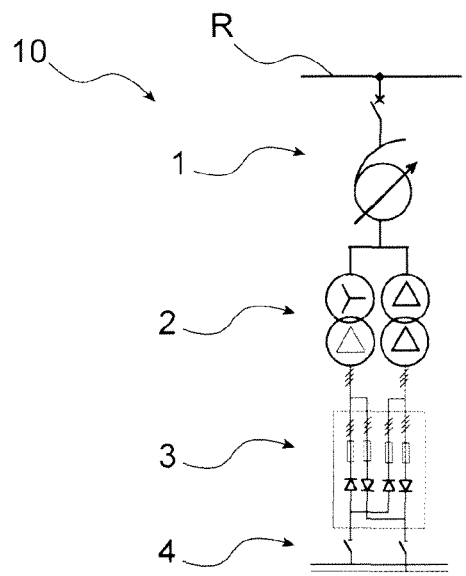
FIG. 1 shows an example of a rectifier circuit of an installation of an electrolysis plant.
Figure 2:
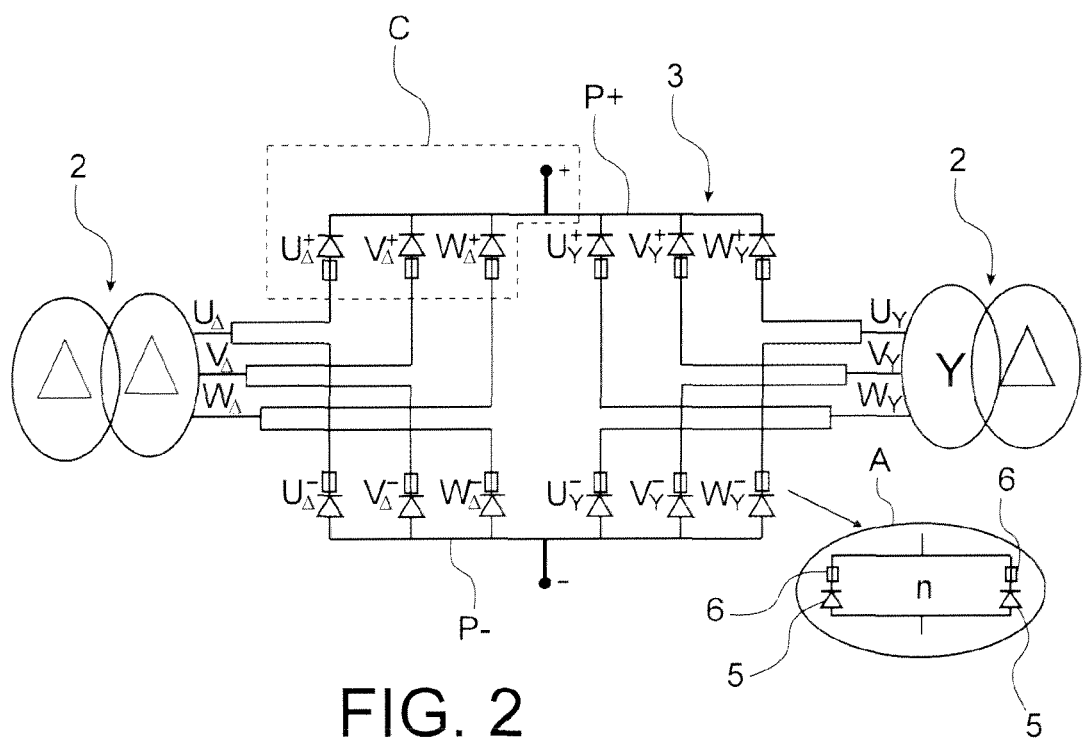
FIG. 2 is a more detailed view of the rectifier transformer and of the rectifier of the rectifier circuit of FIG. 1.

FIGS. 3 to 6 show the layout of the three arms B1, B2, B3 of the first series $U_A^+$, $V_A^+$, $W_A^+$ of the rectifier bridge, represented by the zone C in FIG. 2.

Naturally, none of the choices mentioned above are limiting. In particular, the three-dimensional configuration (or architecture) of the three arms B1, B2, B3 connected to $U_A^+$, $V_A^+$, $W_A^+$ may be different. In addition, the three arms connected to $U_Y^+$, $V_Y^+$, $W_Y^+$, the three arms connected to $U_A^-$, $V_A^-$, $W_A^-$ and/or the three arms connected to $U_Y^-$, $V_Y^-$, $W_Y^-$ may also have a non-aligned layout, that may be similar or dissimilar to the layout described for the three arms B1, B2, and B3.

Figure 3:
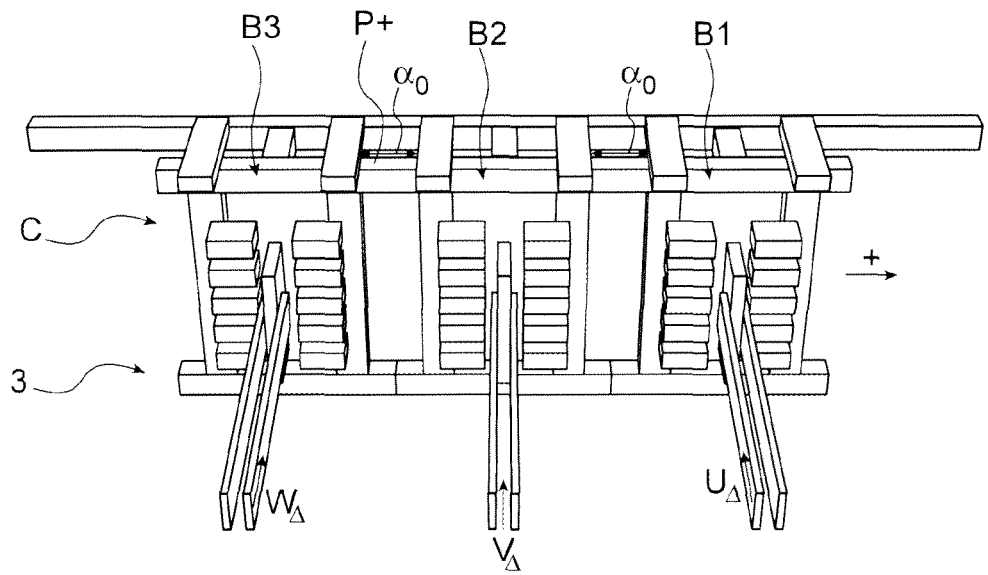
FIG. 3 is a perspective view of the prior art arrangement of arms of a high-power rectifier.
Figure 4:
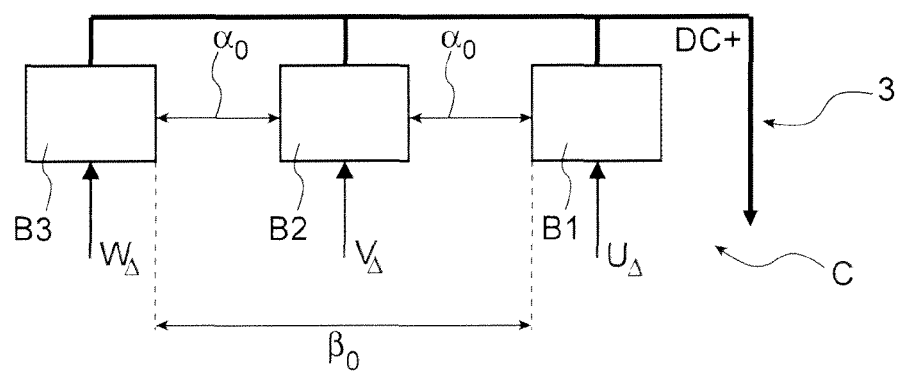
FIG. 4 is a plan view or a cross-section view of the arrangement of the arms of the FIG. 3 rectifier.

The prior art conventional architecture of the three arms B1, B2, B3 (zone C of FIG. 2) is shown in FIGS. 3 and 4.

Each arm B1, B2, B3 includes n components connected in parallel and having their inputs connected to the three AC phases $U_A$, $V_A$, $W_A$ of the rectifier transformer 2 and their outputs connected to the positive polarity of the rectifier.

As can be seen in perspective in FIG. 3 and in cross-section in FIG. 4, the three arms B1, B2, B3 are aligned in the same plane.

Tests conducted on the basis of this architecture in which the three arms B1, B2, B3 are aligned, with DC of about 20 kA, have made it possible to determine a maximum imbalance $dI_{max}$ in current in an arm of about 16%.

The maximum imbalance $dI_{max}$ in current in an arm is calculated by the following formula:

$$dI\max = 100 \times \frac{I\max \text{ of a component in the arm} - I\text{mean of all of the components in the arm}}{I\text{mean of all of the components in the arm}}$$

A maximum imbalance $dI_{max}$ of about 16% means that at least one component passes 16% more current than the mean of the current in the arm to which it belongs. In particular, this component having the greatest imbalance in current is situated on the central arm B2.

Such a prior art embodiment with aligned arms is not fully satisfactory because it requires all of the components of the rectifier, i.e. 240 components for a rectifier having 20 components per arm for example, to be dimensioned relative to the component that is the most imbalanced in current, i.e. the one that has an imbalance of 16%.

Figure 5:
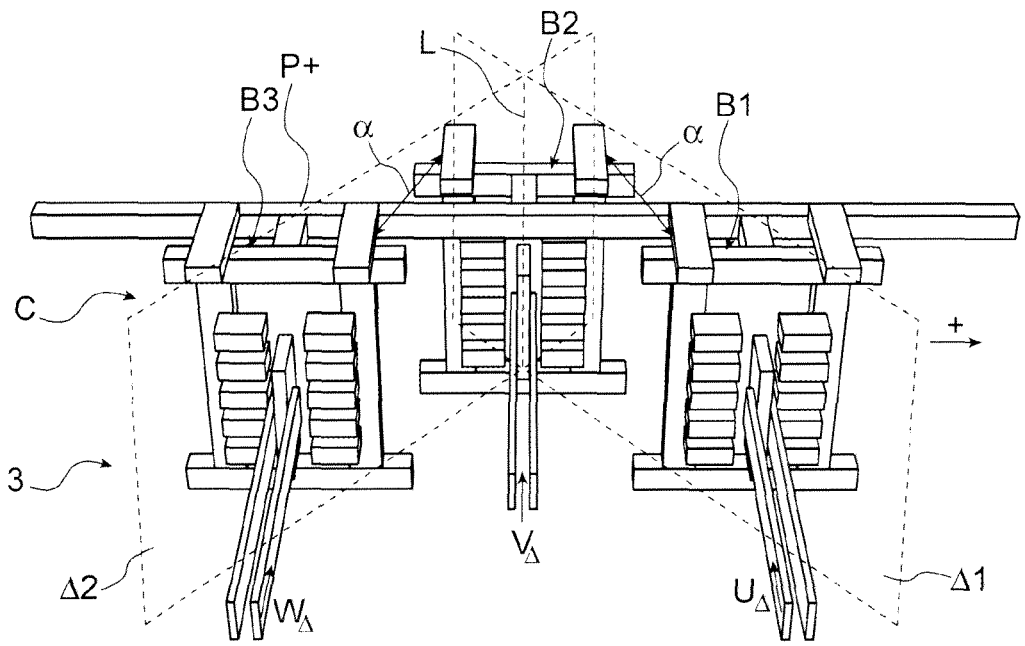
FIG. 5 is a perspective view of the arrangement of the invention of arms of a high-power rectifier.
Figure 6:
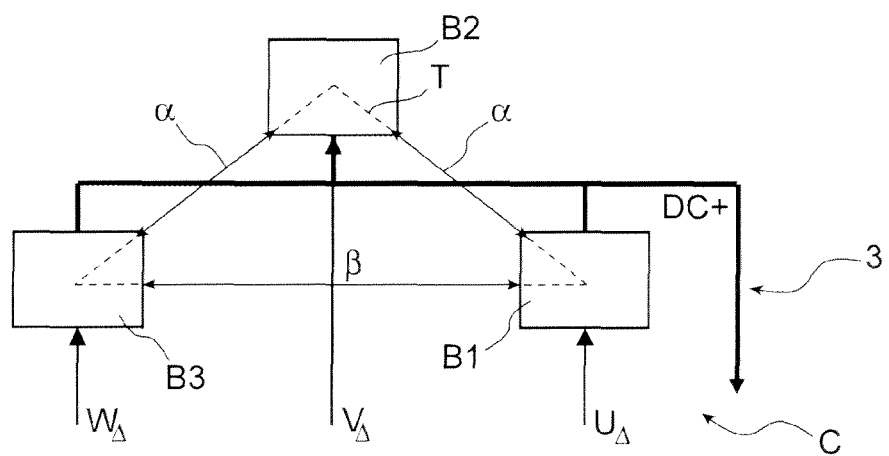
FIG. 6 is a plan view or a cross-section view of the arrangement of the arms of the FIG. 5 rectifier.

FIGS. 5 and 6 are respectively a perspective view and cross-sectional view showing the arrangement of the arms B1, B2, and B3 of the invention.

The arms B1, B2, and B3 are disposed, as can be seen in these figures, in a manner not aligned in the same plane. In particular, as can be seen in FIG. 6, the arms B1, B2, and B3 define, in cross-section, the vertices of a triangle T.

In addition, as can be seen in FIG. 5, a first subset of the arms comprising the first arm B1 and the second arm B2 are aligned in a first plane $\Delta 1$ and a second subset of the arms comprising the second arm B2 and the third arm B3 are aligned in a second plane $\Delta 2$, the first plane $\Delta 1$ and the second plane $\Delta 2$ intersecting at a straight line L.

The distance $\alpha$ between the two consecutive arms B1 and B2 and the two consecutive arms B2 and B3 is greater than the distance $\alpha_0$ between the same two consecutive arms B1 & B2, and B2 & B3, in the configuration in which the arms B1, B2 and B3 are aligned in the same plane, as shown in FIG. 4.

In particular, the distance $\alpha$ may be greater than or equal to 500 millimeters (mm).

The non-aligned layout of the arms of the rectifier of the invention can thus make it possible to increase the distance $\alpha$ between the arms, facilitating access for maintenance.

It has been observed that the magnetic field that is generated during switching of components of any one arm has a non-negligible influence on other arms. By increasing the distance $\alpha$ between the arms, the influence of the magnetic field is reduced and the components of the arms are less disturbed by the magnetic fields generated by the components of the other arms.

In addition, the distance $\beta$ between the first arm B1 and the third arm B3, where the first arm B1 and third arm B3 are situated on either side of the second arm B2, is less than the distance $\beta_0$ between said first arm B1 and said third arm B3 in the configuration in which the three arms B1, B2, and B3 are aligned, as shown in FIG. 4. Having a non-aligned architecture of the invention makes it possible to reduce the distance $\beta$ between the two end arms B1 and B3 of the series of arms, while also enabling the distance $\alpha$ between two consecutive arms to be increased, thereby making it possible to provide a more compact architecture for the rectifier and to save space, including for transport purposes, while also maintaining access for maintenance.

Tests conducted on the basis of the architecture of the invention shown in FIGS. 5 and 6, with DC of about 20 kA, have made it possible to determine a maximum imbalance $dI_{max}$ in current in an arm of about 11%.

In other words, at least one component passes 11% more current than the mean of the current in the arm to which it belongs.

The misalignment of the arms B1, B2, and B3 and the increase in the distance $\alpha$ between the arms thus make it possible to reduce the maximum imbalance $dI_{max}$ in current of the rectifier, thereby facilitating dimensioning of the rectifier.

Naturally, the invention is not limited to the above-described embodiment. Various modifications may be made by the person skilled in the art.

The expression "including a" should be understood as being synonymous with "including at least one" unless otherwise specified.

What is claimed is:
1. A power converter including:
   a positive converter bridge to be connected to phases of a first secondary and to phases of a second secondary of a transformer;
   a negative converter bridge to be connected to the phases of the first secondary and to the phases of the second secondary of the transformer;
   the positive converter bridge and the negative converter bridge being of a diode bridge type and being connected in parallel;
   the positive converter bridge and the negative converter bridge including a first subset of arms of components connected to the phases of the first secondary of the transformer and a second subset of arms of components connected to the phases of the second secondary of the transformer;
   wherein at least one subset of arms of the components includes arms disposed relative to one another in such a manner as not to be aligned in a same plane, and wherein, when observed in cross-section, the arms of said at least one subset of arms of components define vertices of a polygon; and
   wherein at least a first subset of the arms includes arms aligned in a first plane, and at least a second subset of the arms includes arms aligned in a second plane, the first plane intersecting the second plane.

2. A power converter according to claim 1, being a high-power rectifier for electrolysis.

3. A power converter according to claim 1, being a twelve-phase power converter and wherein the positive converter bridge and the negative converter bridge each include six arms of semiconductor components comprising a first subset of three arms connected to the phases of the first secondary of the transformer and a second subset of three arms connected to the phases of the second secondary of the transformer.

4. A power converter according to claim 1, wherein, when observed in cross-section, the arms of said at least one subset of arms of components define the vertices of a triangle.

5. A power converter according to claim 1, wherein the maximum value for the imbalance in current in any given arm of the positive converter bridge and/or of the negative converter bridge is less than or equal to 15%, this maximum value being determined by the following formula:

$$dI\text{max} = 100 \times \frac{I\textit{max} \text{ of a component in the arm} - I\textit{mean} \text{ of all of the components in the arm}}{I\textit{mean} \text{ of all of the components in the arm}}.$$

6. A power converter according to claim 1, wherein each arm of the positive converter bridge and/or of the negative converter bridge is connected in parallel to a plurality of diodes and/or thyristors, each diode or thyristor being connected in series with a fuse.

7. A power converter according to claim 1, wherein a distance between two consecutive arms of said at least one subset of arms of components is greater than a distance that would exist between said two consecutive arms in any configuration in which the arms of said at least one subset of arms of components are disposed relative to one another in such a manner as to be aligned in the same plane.

8. A power converter according to claim 1, wherein a first arm and a third arm are situated on either side of a second arm of said at least one set, and a distance between the first arm and the third arm is less than the distance that would exist between said first arm and said third arm in any configuration in which the first, second, and third arms of said subset of arms of components are disposed relative to one another in such a manner as to be aligned in the same plane.

9. A high-power converter circuit, including
the transformer including the first secondary and the second secondary; and
the power converter according to claim 1.

* * * * *